C. ALTER.
EYEGLASSES.
APPLICATION FILED FEB. 28, 1910.
962,873.
Patented June 28, 1910.
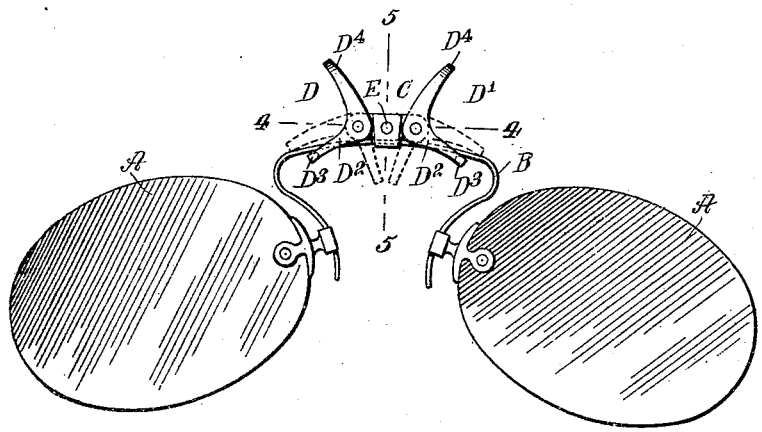
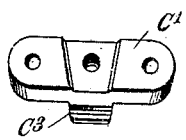
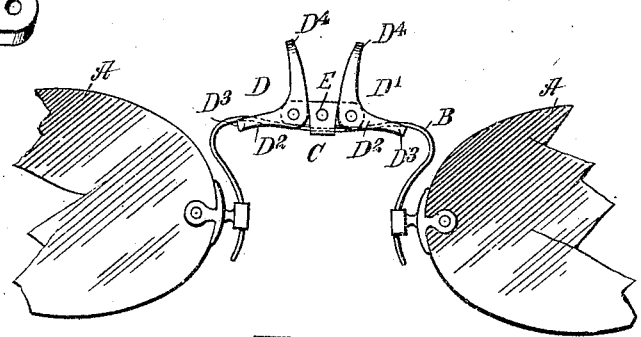
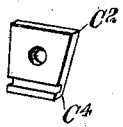
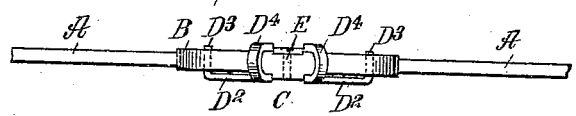
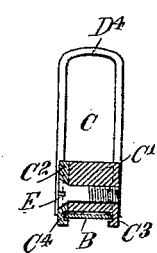
WITNESSES:
William P. Goebel
Geo. J. Hoster
INVENTOR
Christian Alter
BY Munn & Co
ATTORNEYS

UNITED STATES PATENT OFFICE.

CHRISTIAN ALTER, OF NEW YORK, N. Y.

EYEGLASSES.

962,873.   Specification of Letters Patent.   Patented June 28, 1910.

Application filed February 28, 1910. Serial No. 546,443.

*To all whom it may concern:*

Be it known that I, CHRISTIAN ALTER, a citizen of the United States, and a resident of the city of New York, borough of Manhattan, in the county and State of New York, have invented new and useful Improvements in Eyeglasses, of which the following is a full, clear, and exact description.

The invention relates to eye glasses having a pair of lenses connected with each other by a bow spring, and the object of the invention is to provide certain new and useful improvements in eye glasses, whereby the same can be readily placed in position on the wearer's nose or removed therefrom by manipulating the bow spring, to move the lenses a sufficient distance apart to allow of conveniently placing the eye glasses in position on the nose or removing the same therefrom.

For the purpose mentioned use is made of a bearing block attached to the bow spring approximately at the middle thereof, and bell crank levers fulcrumed on the said block and extending in opposite directions, one of the arms of each lever engaging the bow spring, and the other arm of each lever extending above the bow spring and forming a finger piece to be taken hold of by the user.

A practical embodiment of the invention is represented in the accompanying drawings forming a part of this specification, in which similar characters of reference indicate corresponding parts in all the views.

Figure 1 is a front face view of the eye glasses and showing the parts in normal position; Fig. 2 is a like view of the same and showing the lenses spread; Fig. 3 is a plan view of the same; Fig. 4 is an enlarged sectional plan view of the same on the line 4—4 of Fig. 1; Fig. 5 is an enlarged transverse section of the same on the line 5—5 of Fig. 1; Fig. 6 is a perspective view of one of the clamping members of the bearing block; and Fig. 7 is a like view of the other clamping member of the bearing block.

The eye glasses shown in the drawings consist of the lenses A, connected with each other by a bow spring B, and on the latter is secured a bearing block C provided with bell crank levers D and D', extending in opposite directions, each crank lever having one arm $D^2$ provided with a transverse lug $D^3$ adapted to engage the under side of the bow spring B, a distance to one side of the clamping block C. Each crank lever D or D' has an arm $D^4$ extending upwardly to form a finger piece, adapted to be taken hold of by the user, so that when the user takes hold of the two finger pieces and presses the same toward each other, then the lugs $D^3$ exert an upward pressure on the under side of the bow spring B, thus causing the bow spring B to bend and spread the lenses A apart, as plainly indicated in Fig. 2. When the lenses are in this position, the user can conveniently place the eye glasses in position on the nose or remove the same therefrom, it being understood that in placing the same on the nose the user finally releases the pressure on the finger pieces $D^4$, to allow the bow spring B to return by its own resiliency to its normal position, thus moving the lenses A toward each other, to engage the clamps thereof with the sides of the nose to hold the eye glasses in position. In a like manner, when it is desired to remove the eye glasses from the nose, the operator presses the finger pieces $D^4$ toward each other to again spread the lenses apart for disengagement of the clamps from the sides of the nose.

The clamping block C is preferably formed of two clamping members C', $C^2$, fastened together by a screw E, and the said clamping members C' and $C^2$ are provided at their inner opposite faces with longitudinally-extending grooves $C^3$, $C^4$, engaging the bow spring B at opposite sides thereof, so that when the screw E is screwed up, the clamping members C' and $C^2$ are firmly clamped in position on the bow spring B, approximately at the middle thereof. The arms $D^4$ of the bell cranks levers D, D' are preferably made in the form of stirrups, to form a convenient finger piece to be taken hold of by the user.

The device for manipulating the bow spring B can be conveniently and readily fastened in position on the bow spring of eye glasses of the type mentioned and as now constructed, so that no change whatever in the eye glasses themselves is required.

The device for opening the bow spring, shown and described, is very simple and can be cheaply manufactured.

Having thus described my invention, I claim as new and desire to secure by Letters Patent:

1. Eye glasses, comprising a pair of lenses, a bow spring connecting the said lenses with each other, a block on the said bow spring, and a pair of levers fulcrumed on the said block and engaging the said bow spring on opposite sides of the said block.

2. Eye glasses, comprising a pair of lenses, a bow spring connecting the lenses with each other, a block clamped on the said bow spring approximately at the middle thereof, and a pair of bell crank levers fulcrumed on the said block and extending in opposite directions, one arm of each of the said levers engaging the under side of the bow spring, and the other arm forming a finger piece to be taken hold of by the user.

3. An opening device for eye glasses having a pair of lenses connected with each other by a bow spring, comprising a block attached to the bow spring approximately at the middle thereof, and a pair of bell crank levers fulcrumed on the said block and extending in opposite directions, one of the arms of each bell crank lever having a transverse lug for engagement with the under side of the bow spring to one side of the said block, and the other arm of each bell crank lever forming a finger piece to be taken hold of by the user.

4. An opening device for eye glasses having a pair of lenses connected with each other by a bow spring, comprising a block formed of two grooved clamping members and a screw for fastening the members together, the said clamping members being clamped to the bow spring approximately at the middle thereof, and a pair of bell crank levers fulcrumed on the said block and extending in opposite directions, one of the arms of each bell crank lever having a transverse lug for engagement with the under side of the bow spring to one side of the said block, and the other arm of each bell crank lever forming a finger piece to be taken hold of by the user.

In testimony whereof I have signed my name to this specification in the presence of two subscribing witnesses.

CHRISTIAN ALTER.

Witnesses:
    THEO. G. HOSTER,
    PHILIP D. ROLLHAUS.